United States Patent [19]

Schürmann et al.

[11] Patent Number: 5,646,607
[45] Date of Patent: Jul. 8, 1997

[54] TRANSPONDER/INTERROGATOR PROTOCOL IN A MULTI-INTERROGATOR FIELD

[75] Inventors: Josef H. Schürmann; Herbert Meier, both of Moosburg, Germany

[73] Assignee: Texas Instruments Incorporated, Dallas, Tex.

[21] Appl. No.: 528,453

[22] Filed: Sep. 14, 1995

Related U.S. Application Data

[63] Continuation of Ser. No. 855,126, Mar. 18, 1992, abandoned, which is a continuation of Ser. No. 538,798, Jun. 15, 1990, abandoned.

[51] Int. Cl.$^6$ .................................................. H04Q 9/00
[52] U.S. Cl. ................... 340/825.54; 340/825.5; 455/517
[58] Field of Search .................... 340/825.54, 825.69, 340/825.72, 825.06, 825.49, 825.5, 504, 505, 573; 379/55; 370/85.2, 85.3; 455/41, 49.1, 58.2; 342/44, 51

[56] References Cited

U.S. PATENT DOCUMENTS

| | | | |
|---|---|---|---|
| 4,013,959 | 3/1977 | Patterson | 455/58.2 |
| 4,477,809 | 10/1984 | Bose | 340/825.54 |
| 5,042,083 | 8/1991 | Ichikawa | 370/85.3 |

Primary Examiner—Jeffery Hoffsass
Assistant Examiner—Andrew Hill
Attorney, Agent, or Firm—Rebecca A. Mapstone; James C. Kesterson; Richard L. Donaldson

[57] ABSTRACT

A method is described with the aid of which messages can be transmitted from batteryless transponders to interrogation devices. The interrogation devices are equipped with a receiving section and a transmitting section and as a request to transmit the message stored therein as reaction to an interrogation command rendered effective in the interrogation device said devices transmit an HF interrogation pulse with predetermined carrier frequency and predetermined carrier duration. In the transponder this HF interrogation pulse is utilized to generate a supply voltage. Each interrogation device checks as reaction to an interrogation command whether its receiving section (14) is receiving a signal with the carrier frequency. If no such signal is being received, the interrogation device transmits the HF interrogation pulse after expiry of a wait time of at least the predetermined message duration whereas, if it is receiving a signal with the carrier frequency, the HF interrogation pulse is not sent until the reception of said signal terminates and at least the wait time has expired or a delay time has passed which is longer than the sum of the predetermined carrier duration and the wait time.

10 Claims, 2 Drawing Sheets

TRANSPONDER/INTERROGATOR PROTOCOL IN A MULTI-INTERROGATOR FIELD

This is a continuation, of application Ser. No. 07/855,126, filed Mar. 18, 1992, abandoned, which is a continuation of application Ser. No. 07/538,798 filed Jun. 15, 1990, abandoned.

FIELD OF THE INVENTION

The invention relates to a method of transmitting messages with predetermined message duration from batteryless transponders to interrogation devices which are equipped with a receiving section and a transmitting section and which transmit to the transponders, as request for transmission of the message stored therein in response to an interrogation command, an HF interrogation pulse of predetermined carrier frequency and predetermined carrier duration which is utilized in the transponder simultaneously for generating a supply voltage.

BACKGROUND OF THE INVENTION

Identification systems exist in which persons, objects, animals or the like each equipped with a transponder, can be identified by means of interrogation devices. In each transponder a message is stored which uniquely identifies the person, object or animal and which in response to reception of a high frequency interrogation pulse is transmitted by the transponder. This renders the interrogation device able to receive and evaluate the message.

A concrete example for such an identification system is a system in which animals, for example pigs housed in a pigsty, are each provided with a transponder in the form of an implanted earmark. The intention of the identification system is to make it possible, even with a large number of animals, to exactly identify each individual animal at any time to permit exact supervision of the individual animals. In this example of use in the pigsty several fixedly installed interrogation devices are in operation which in recurring intervals transmit HF interrogation pulses which can be received by the transponders which happen to be within range of the transmitter of the interrogation device. Since the range is only limited it is only in exceptional cases that several animals are simultaneously present within the range. It can for example be ensured by constructional steps within the pigsty that in fact always only one animal is within the transmitter range.

However, in addition to the fixedly installed interrogation devices, hand devices may also be used with which the transponders of individual animals can be interrogated quite specifically by bringing the hand device into the vicinity of the animal of interest and then transmitting the HF interrogation pulse.

In the example outlined the transponders have very small dimensions and are batteryless devices which derive their supply power solely from the received HF interrogation pulse. This means, however, that the transmission power for transmitting the message stored in them is very small so that accordingly only a small range can be achieved. Since the transmission power of the stationarily arranged interrogation devices and of the hand devices can be substantially greater because of the presence of their own power supply means, by suitable steps it must be ensured that the messages transmitted by the transponders cannot be concealed by the HF interrogation pulses, thus then not being received by the interrogation devices. Such a step would be to synchronize the interrogation devices with each other in such a manner that they transmit the HF interrogation pulses in each case exactly simultaneously so that the transponders can send their message to the interrogation device lying closest to the transponder in the pauses between said pulses. However, this solution requires that all the interrogation devices operate in a fixed time pattern in which the time interval between the HF interrogation pulses must be set so that the most unfavourable transmission case is still also taken into account. However, precisely in the example outlined above, it can occur that animals moving rapidly past the interrogation devices are not detected because the pauses between the interrogation pulses are too long.

The problem underlying the invention is to provide a method of the type outlined at the beginning which with any desired number of interrogation devices and transponders in an interrogation area permits rapid and reliable message transmission from the individual transponders to the interrogation devices without the latter mutually influencing each other.

According to the invention, this problem is solved in that each interrogation device as a reaction to an interrogation command checks whether its receiving section is receiving a signal with the carrier frequency. Then, if no such signal is being received, interrogation device transmits the HF interrogation pulse after expiry of a wait time of at least the predetermined message duration. However, when such a signal is being received the interrogation device does not transmit the HF interrogation pulse until the reception of said signal terminates and at least the wait time has expired or a delay time has expired which is longer than the sum of the predetermined carrier duration and the wait time.

BRIEF DESCRIPTION OF THE DRAWINGS

An example of embodiment of the invention will now be described in detail with the aid of the drawings, wherein.

DETAILED DESCRIPTION OF THE PREFERRED EMBODIMENTS

The invention will be described hereinafter in relationship to a system with the aid of which animals, for example pigs, housed within a limited area can be individually and continuously identified. The area is for example a pigsty in which a large number of animals can roam freely. At several points of the pigsty interrogation devices are fixedly installed which transmit HF interrogation pulses at regular intervals. The animals are equipped with transponders which they can carry as eartags or marks or implant beneath the skin. The stationarily installed interrogation devices, on radiating the HF interrogation pulses, have a range large enough to ensure that in the sty no area remains which is not covered by one of the interrogation devices. When an animal comes into the region of an interrogation device which happens to be sending an HF interrogation pulse the transponder carried by the animal is caused to transmit the message stored therein which is thereupon received by the interrogation device and decoded to identify the animal. In this manner information is continuously available on the animals present in the sty and can be utilized for a great variety of purposes. For example at a point in the sty scales may be installed over which the animals pass from time to time during their movement in the sty. By cooperation of an interrogation device installed in the immediate vicinity of the scales and of the transponder of the animal which is disposed at that instant on the scales a clear association of the weight just determined by the scales with the respective animal can be made. It is possible in this manner to determine individually the weight of the animals located in the sty and monitor it for evaluation purposes.

Since they are fixedly installed and it is therefore possible to supply their power from the mains network, the stationary interrogation devices can transmit with a relatively high power and thus also with a large range whilst the transponders carried by the animals can of course operate only with substantially lower transmission power because they must be made spatially very much smaller and do not contain their own power source but derive their supply energy solely from the HF interrogation pulse received by them.

Figure 1:
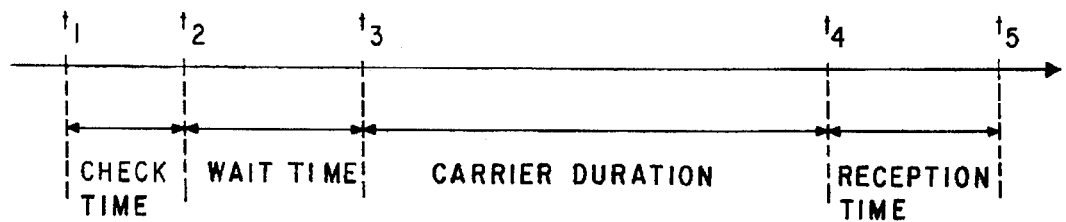
FIG. 1 shows a time sequence diagram which shows the individual operating phases of an individual interrogation device without influence by a further interrogation device.

An interrogation cycle as takes place in the cooperation between an interrogation device and a transponder will now be described with reference to FIG. 1. The interrogation device preferably contains a sequence or cycle control arrangement with which the individual steps of the interrogation cycle can be initiated. At the instant $t_1$ the interrogation cycle in which an interrogation command is internally generated starts. This interrogation command must not, however, lead immediately to transmission of the HF interrogation pulse because in the example of use described a plurality of interrogation devices are present in the monitored area and these may likewise be active. For it may be the case that another interrogation device has already transmitted an HF interrogation pulse and is waiting to see whether a transponder addressed in its transmission region sends back the message stored therein. If the one interrogation device sent the HF interrogation pulse in this period the other interrogation device which is waiting for reception of the message stored in a transponder could not receive said message because it would be overwritten by the HF interrogation pulse. The interrogation device checks in the time between $t_1$ and $t_2$ whether another interrogation device is active, i.e. happens to be transmitting an HF interrogation pulse. If the result of this test is negative, the interrogation device waits from the instant $t_2$ to the instant $t_3$ to give another interrogation device which has already sent an HF interrogation pulse the opportunity of receiving a message sent back by a transponder as response to the HF interrogation pulse. It is only at the instant $t_3$ that the one interrogation device starts to transmit the HF interrogation pulse. After termination of said HF interrogation pulse at the instant $t_4$ a reception time starts which lasts until the instant $t_5$. During this time the interrogation device is ready-to-receive so as to receive, if necessary, a message from an addressed transponder. This cycle is continuously repeated by the interrogation device in the order outlined unless other interrogation devices are also transmitting HF interrogation pulses which can be received within the period from the instant $t_1$ to the instant $t_2$.

If in the check time period from the instant $t_1$ to the instant $t_2$ an HF interrogation pulse is received, the interrogation device which at the instant $t_1$ internally received the command to execute an interrogation cycle displaces the start of the wait time until it has detected the termination of the HF interrogation pulse of the other interrogation device. The termination of the HF interrogation pulse of the other interrogation device is then followed by the wait time so that the other device can receive any message which might have been sent back by a transponder. It is only after the wait time that the interrogation device then evaluates the HF interrogation pulse.

Since in the defined area in which the interrogation devices are installed, all the devices operate in accordance with the cycle outlined, there is no possibility of the case where interrogation devices having transmission ranges which overlap, transmit HF interrogation pulses in the periods of time in which a respective other device might possibly be receiving a returned message from a transponder.

When the described system having several interrogation devices in a predetermined area is set in operation, on a chance basis one of the interrogation devices will be the first to transmit the HF interrogation pulse. The other interrogation devices will then recognise this so that they delay the transmission of their HF interrogation pulses until the reception time of the first interrogation device has expired. Directly following this all the other interrogation devices will simultaneously transmit their HF pulses so that in practice a sort of synchronization of the interrogation devices results without the interrogation devices being directly connected to each other.

In the example of use outlined not only stationarily installed interrogation devices may be in operation but also portable devices which, for example, are operated by a veterinary surgeon who wishes to identify a specific animal. The transponders of the animals can then be consecutively interrogated by bringing the hand device into the vicinity of the animal, whereupon by actuating a trigger switch or pushbutton transmission of the HF interrogation pulse is initiated. Since this hand device is not connected in any way to the stationarily installed interrogation devices it is particularly important in this case for the various devices not to mutually interfere with each other, in particular for the hand device not to be prevented from receiving the response of the interrogated transponder.

The interference-free operation is achieved in that in the hand device as well the operations which have been described above in conjunction with the stationarily installed devices also take place. This means that the hand device after actuation of the trigger switch also firstly checks within a check time whether another device happens at that time to be transmitting an HF interrogation pulse. If the hand device does not receive any HF interrogation pulse it waits under all circumstances for the duration of the wait time and only then transmits the HF interrogation pulse. If during the wait time the hand device detects the start of transmission of an HF interrogation pulse by another device it immediately starts the transmission of its own HF interrogation pulse because in this case it is assumed that the other interrogation device has also already carried out a check to determine whether an HF interrogation pulse is being transmitted. Since the other device, however, has started transmission of the HF interrogation pulse this means that it did not detect any other HF interrogation pulse and consequently the hand device can readily also simultaneously transmit its own HF interrogation pulse without the possibility of this leading to disturbances of other devices. The hand device thus automatically synchronizes itself with the other interrogation devices so that a troublefree operation is ensured.

Figure 2:
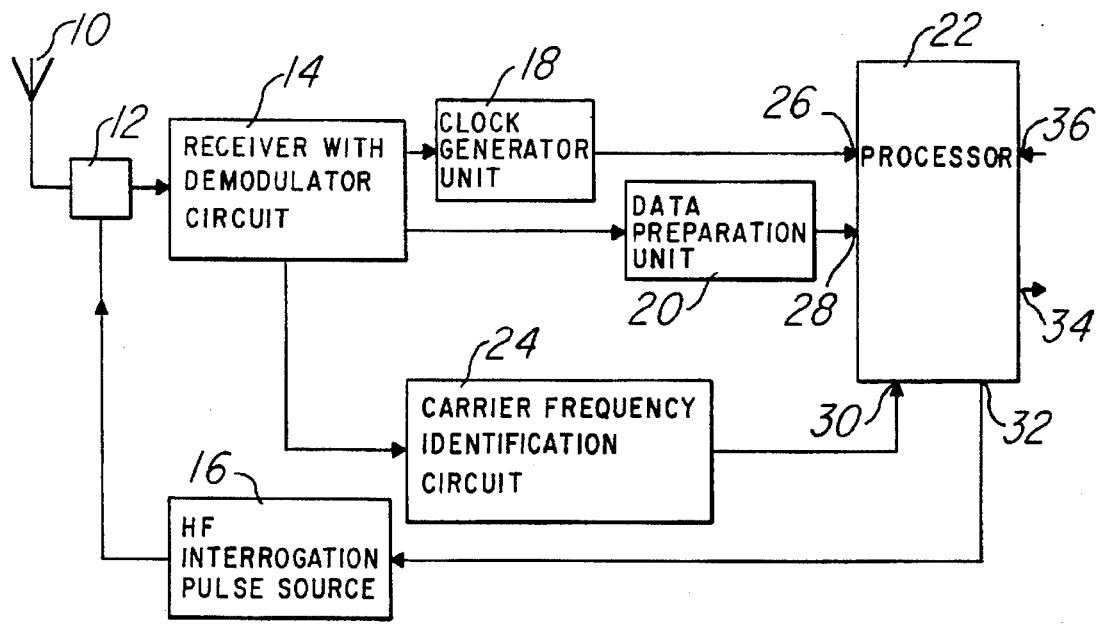
FIG. 2 is a basic circuit diagram of an interrogation device for applying the method according to the invention and FIG. 3 is a more exact illustration of a circuit part which in the interrogation device of FIG. 2 produces the sequence of the method according to the invention.

With reference to FIG. 2 the basic structure of an interrogation device with which the method outlined above can be used will now be described.

The interrogation device includes an antenna 10 which serves simultaneously as receiving and transmitting antenna. Via a transmission/reception switchpoint 12 the antenna 10 is connected to a receiver and demodulator circuit 14 and to an HF interrogation pulse source 16. Connected to the receiver and demodulator circuit 14 is a clock generator unit 18 which derives a clock signal from the signal furnished by the receiver and demodulator circuit. A data preparation unit 20 transforms the signals furnished by the receiver and demodulator circuit 14 so that they can be evaluated in a processor 22 which also receives the clock signals from the clock generator unit 18.

Also connected to the receiver and demodulator circuit 14 is a carrier frequency identification circuit 24 which supplies a signal of predetermined signal value to the processor 22 whenever it has detected that the receiver and demodulator circuit 14 is receiving a carrier frequency via the antenna 10. The HF interrogation pulse source 16 can receive from the processor 22 a trigger signal which causes it to apply an HF interrogation pulse to the transmission/reception switchpoint 12 and thus to the antenna 10.

The processor 22 comprises an input 26 for receiving the clock signals from the clock signal generator unit 18. The data from the data preparation unit 20 are supplied to the processor 22 at an input 28. The signal from the carrier frequency identification circuit 24 indicating reception of a carrier frequency is supplied to the processor 22 at an input 30. The trigger signal for the HF interrogation pulse is furnished by the processor 22 at its output 32. At an output 34 the processor furnishes the evaluated data for further processing. The data may for example be supplied to a display unit and also to a central computer for further evaluation. A switching signal causing the processor 22 to furnish the signal For triggering the HF interrogation pulse 16 at the output 32 may be supplied to said processor 22 at an input 36. If the interrogation device is a stationarily installed device the processor 22 can also internally generate the signal supplied to the HF interrogation pulse 16 so that the input 36 is not required. This input is required only when the interrogation device is a hand device which has a trigger or activating switch on actuation of which by an operator the processor 22 is caused to emit at the output 32 the trigger signal for the HF interrogation pulse source 16.

With the aid of the interrogation device shown in FIG. 2 it is thus possible for an HF interrogation pulse to be sent to a transponder which in response to the pulse is caused to send back the message stored therein. The interrogation device can receive said message by means of the antenna 10, demodulate it and evaluate it in the processor 22. To ensure that the transmission of the HF interrogation pulse does not take place at an instant at which another interrogation device is just waiting for a response from a transponder, the interrogation device contains as essential component the carrier frequency identification circuit 24 which informs the processor of the presence of a carrier frequency signal when another interrogation device is transmitting so that the processor 22 activates the HF interrogation pulse source only after termination of said carrier frequency signal.

Figure 3:
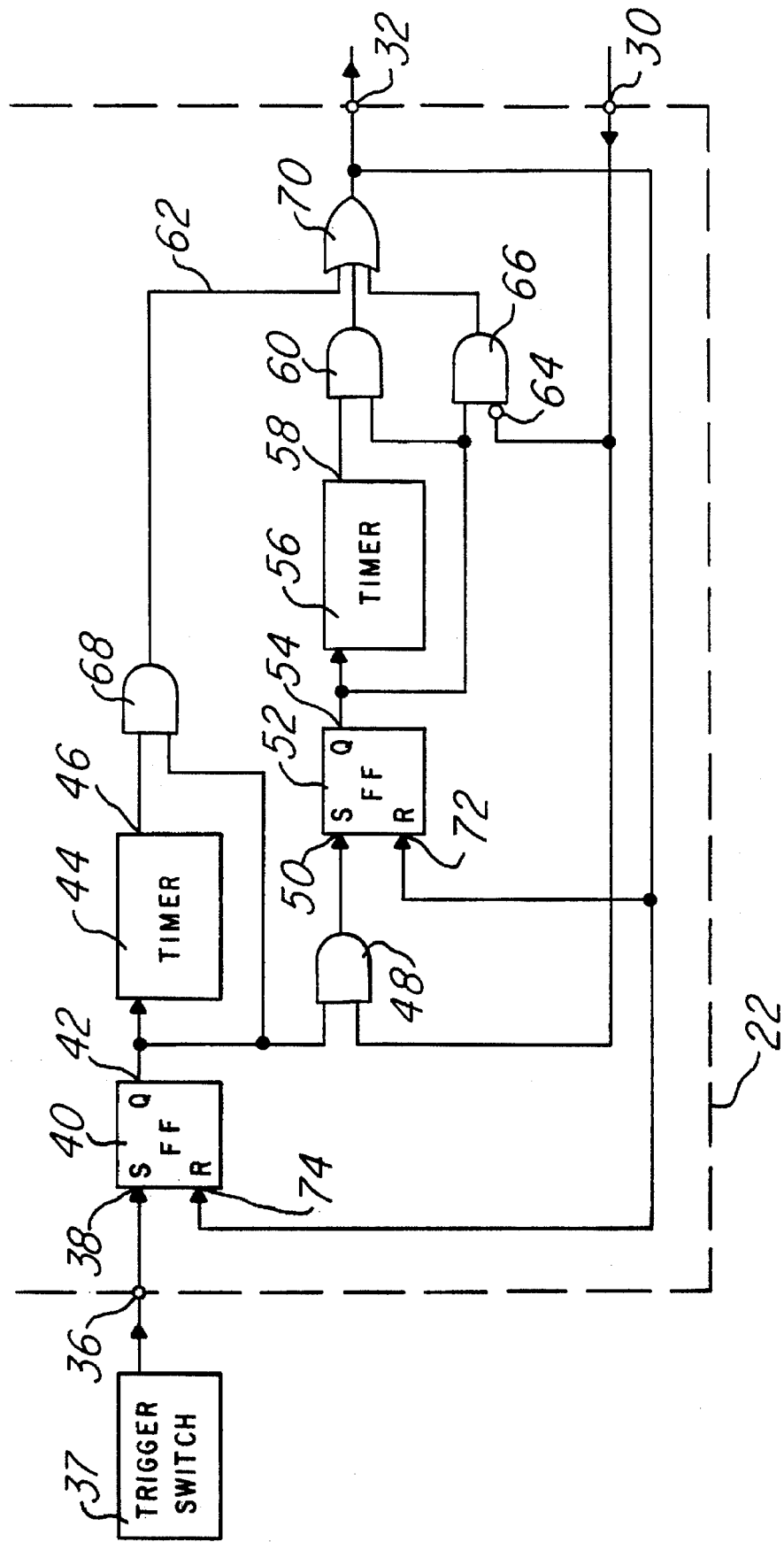

An example of the circuit section in the processor 22, which permits the function sequence outlined above for obtaining a reliable data transmission without mutual interference between transponders and the interrogation devices, is illustrated in FIG. 3. It is expressly pointed out that the structure of said circuit section only represents one of many possibilities; in particular, it is also possible to implement the functions achieved with the circuit section by means of a program fixedly stored in the processor 22.

It will be assumed in the description that the processor 22 is part of a hand device which means that it is provided with an input 36 which is connected to a trigger switch 37. As mentioned, an operator actuates said trigger switch 37 when the hand device is to transmit an HF interrogation pulse. Actuation of the trigger switch effects application of a signal to the set input 38 of a flip-flop 40 which thereby passes into the set state. As a consequence of this, a signal with the value "1" is furnished at the output 42 of said flip-flop. By this signal a timer 44, formed for example by a monoflop, is started, said timer being set so that after a predetermined delay time following the start it furnishes at its output 46 a signal having the value "1". At the same time the signal with the value "1" passes from the output 42 of the flip-flop 40 to an AND circuit 48 which comprises a further input which is in connection with the input 30 of the processor 22. This is the input at which the processor 22 receives from the carrier frequency identification circuit 24 a signal containing information on whether or not a carrier frequency signal is being received by the antenna 10. The level relationships of said signal are chosen such that the carrier frequency identification circuit 24 furnishes a signal with the value "1" when no carrier frequency signal is being received by the antenna 10 whilst it furnishes in the converse case a signal with the value "0". This means in the circuit of FIG. 3 that the AND circuit 48 furnishes at its output a signal with the value "1" only when the flip-flop 40 is set and no carrier frequency signal is being received by the antenna 10, i.e. a signal with the value "1" is present at the input 30. Under these conditions the AND circuit 48 applies to the set input 50 of a further flip-flop 52 a set signal which effects that the flip-flop furnishes at the output 54 a signal with the value "1" which starts a further timer 56 also formed by a monoflop. The timer is set so that after starting it furnishes a signal with the value "1" at its output 58 only after expiry of the wait time. Since the flip-flop 52 is still set the signal at the output 58 of the timer 56 causes the AND circuit 60 to furnish a signal with the value "1" at its output as well and this signal is switched through an OR circuit 62 to the output 32 of the processor 22. As a result the HF interrogation pulse source 16 is activated to transmit an HF interrogation pulse. The section of the circuit of FIG. 3 described so far has thus effected that after actuation of the trigger switch an HF interrogation pulse is transmitted by the interrogation device only after the wait time which has been defined by the timer 56 if, as assumed, no carrier frequency signal is being received by the antenna 10. Since in the description of FIG. 3 it is assumed that this is part of a hand device, the wait time does not immediately follow actuation of the trigger switch 37 by the operator of the hand device, but instead firstly in the carrier frequency identification circuit 24 the check is made to determine whether a carrier frequency signal is being received, this corresponding in the time diagram of FIG. 1 to the check time from $t_1$ to $t_2$.

If in the course of the wait time the carrier frequency identification circuit 24 detects reception of a carrier frequency signal a signal with the value "0" appears at the input 30 and is supplied to a negated input 64 of a further AND circuit 66. Said AND circuit 66 also receives the output signal of the flip-flop 52 which when the flip-flop 52 is set has the value "1". The AND circuit 66 thus furnishes under these circumstances at the output a signal with the value "1" which is switched through via the OR circuit 62 to the output 32 of the processor 22 and also activates transmission of the HF interrogation pulse. Said transmission of the HF interrogation pulse, as already described above, can take place during the wait time itself because it is assumed that the interrogation device transmitting the HF interrogation pulse has likewise made a check for the presence of a carrier frequency signal and reached a negative check inclusion. Transmission of the HF interrogation pulse thus cannot lead to interfering with other devices participating in the installed system.

The OR circuit 62 has three inputs which makes it possible to activate transmission of the HF interrogation pulse in a third case as well. This third case arises when for example the carrier frequency identification circuit 24 continuously indicates reception of a carrier frequency signal by the antenna 10. Since the devices participating in the system each transmit the carrier frequency signal for only a limited duration it is assumed that the continuous reception of such a signal originates from an interference source. To ensure that such an interference source does not completely prevent transmission of the HF interrogation pulses by the interrogation devices, after a predetermined period of time which is longer than the sum of the wait time and the duration of the HF interrogation pulse the HF interrogation pulse is transmitted in any case. This transmission takes place when the hold time of the timer 44 has expired. The timer 44 then furnishes at its output 46 a signal with the value "1" to an AND circuit 68 which at a second input also receives the output signal of the flip-flop 40. When both input signals of the AND circuit 68 assume the value "1", which occurs when the hold time of the timer 44 expires, a signal with the value "1" is switched through from the OR circuit 62 to the output 32 of the processor 22 so that the HF interrogation pulse is transmitted.

As can be seen, the output 70 of the OR circuit 62 is connected to the reset input 72 of the flip-flop 52 and the reset input 74 of the flip-flop 40. As a result, these two flip-flops are returned to the reset state simultaneously with the emission of the signal at the output of the OR circuit 62, which triggers the HF interrogation pulse, and thus the initial conditions for carrying out a new cycle defined.

The outline of the mode of operation of the circuit section of the processor 22 illustrated in FIG. 3 shows that an interrogation device transmits the HF interrogation pulse under three conditions after a corresponding command has either been generated internally or given by actuating a trigger button. The first condition is fulfilled when the check for the presence of a carrier frequency signal was negative and the predetermined wait time has expired without a carrier frequency signal having been detected during the wait time. The second condition is fulfilled when during the wait time a carrier frequency signal has been identified and the third condition is fulfilled when a fixedly predetermined delay time has passed which is longer than the sum of the predetermined duration of the HF interrogation pulse and the wait time, in this case the presence of a carrier frequency signal being disregarded.

We claim:

1. Method of transmitting messages with predetermined message duration from batteryless transponders to interrogation devices which are equipped with a receiving section and a transmitting section and which transmit to the transponders as request for transmission of the message stored therein as reaction to an interrogation command rendered effective in the interrogation device an HF interrogation pulse of predetermined carrier frequency and predetermined carrier duration which is utilized in the transponder simultaneously for generating a supply voltage, characterized in that each interrogation device as a reaction to an interrogation command checks whether its receiving section (14) is receiving a signal with the carrier frequency, that then, if no such signal is being received, it transmits the HF interrogation pulse after expiry of a wait time of at least the predetermined message duration whereas when such a signal is being received it does not transmit the HF interrogation pulse until the reception of said signal terminates and at least the wait time has expired or a delay time has expired which is longer than the sum of the predetermined carrier duration and the wait time.

2. A method of sequentially transmitting interrogation pulses of predetermined carrier frequency and predetermined duration from an interrogator device and receiving transponder messages of predetermined message duration from a transponder in an interrogation region where there is more than one interrogation device transmitting in the same area, comprising the steps of:

monitoring for an interrogation pulse being transmitted by another interrogation device into said area;

waiting for a selected period for a transponder message of predetermined message duration while simultaneously monitoring for the start of another interrogation pulse;

transmitting an interrogation pulse of a predetermined duration into said area at the termination of said waiting period if said start of another interrogation pulse was not detected during said monitoring or said waiting, or transmitting an interrogation pulse of predetermined duration simultaneously with said start of another interrogation pulse if said start of another interrogation pulse is detected during said waiting, and;

receiving a transponder message of predetermined message duration.

3. The method of claim 2, wherein upon detection of said other interrogation signal during said monitoring, said waiting period is delayed until the termination of said other interrogation pulse.

4. The method of claim 2, wherein upon continuous detection of said other interrogation signal during said monitoring, transmission of said interrogation pulse occurs immediately following a delay which is at least the duration of the interrogation pulse and the wait period.

5. The method of claim 2, wherein said interrogation device is a stationary interrogation device.

6. The method of claim 2, wherein said interrogation device is a hand-held interrogation device.

7. The method of claim 2, wherein upon detection of said other interrogation signal during said waiting period, transmission of said interrogation pulse occurs momentarily.

8. A method of sequentially transmitting interrogation pulses of predetermined carrier frequency and predetermined duration from an interrogation device and receiving transponder messages of predetermined message duration from a transponder in an interrogation region where there is more than one interrogation device transmitting in the same area, comprising the steps of:

monitoring for an interrogation pulse being transmitted by another interrogation device into said area;

waiting for a selected period for a transponder message of predetermined duration;

transmitting an interrogation pulse of a predetermined duration into said area period upon failure to detect said another's interrogation pulse during said monitoring and at the termination of said waiting, and wherein upon continuous detection of said anothers' interrogation signal during said monitoring, transmission of said interrogation pulse occurs following a delay which is at least the duration of the interrogation pulse and the wait period, and;

receiving a transponder message of predetermined message duration.

9. The method of claim 8, wherein said interrogation device is a stationary interrogation device.

10. The method of claim 8, wherein said interrogation device is a hand-held interrogation device.

* * * * *